(12) United States Patent
Scofield et al.

(10) Patent No.: US 12,117,647 B2
(45) Date of Patent: Oct. 15, 2024

(54) WAVEGUIDE PLATFORM

(71) Applicant: ROCKLEY PHOTONICS LIMITED, Cheshire (GB)

(72) Inventors: Adam Scofield, Los Angeles, CA (US); Guomin Yu, Glendora, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 244 days.

(21) Appl. No.: 17/798,821

(22) PCT Filed: Feb. 12, 2021

(86) PCT No.: PCT/EP2021/053533
§ 371 (c)(1),
(2) Date: Aug. 10, 2022

(87) PCT Pub. No.: WO2021/160848
PCT Pub. Date: Aug. 19, 2021

(65) Prior Publication Data
US 2023/0083043 A1   Mar. 16, 2023

(30) Foreign Application Priority Data
Feb. 14, 2020   (GB) ..................... 2002071

(51) Int. Cl.
*G02B 6/122*   (2006.01)
*G02B 6/12*   (2006.01)
(Continued)

(52) U.S. Cl.
CPC ....... *G02B 6/1228* (2013.01); *G02B 6/12002* (2013.01); *G02B 6/131* (2013.01);
(Continued)

(58) Field of Classification Search
None
See application file for complete search history.

(56) References Cited

U.S. PATENT DOCUMENTS

| | | | |
|---|---|---|---|
| 5,142,596 A | 8/1992 | Mizuuchi et al. | |
| 6,396,984 B1 | 5/2002 | Cho et al. | |

(Continued)

FOREIGN PATENT DOCUMENTS

| | | |
|---|---|---|
| EP | 1 312 971 A2 | 5/2003 |
| WO | WO 2005/022224 A1 | 3/2005 |
| WO | WO 2009/051562 A1 | 4/2009 |

OTHER PUBLICATIONS

Arrand, H. F. et al., "The Application of Porous Silicon to Optical Waveguiding Technology", IEEE Journal of Selected Topics in Quantum Electronics, Dec. 1, 1998, pp. 975-982, vol. 4, No. 6, IEEE.
(Continued)

*Primary Examiner* — Rhonda S Peace
(74) *Attorney, Agent, or Firm* — Lewis Roca Rothgerber Christie LLP

(57) ABSTRACT

A waveguide platform and method of fabricating a waveguide platform on a silicon wafer; the method comprising: providing a wafer having a layer of crystalline silicon; lithographically defining a first region of the top layer; electrochemically etching the waveguide platform to create porous silicon at the lithographically defined first region; epitaxially growing crystalline silicon on top of the porous silicon to create a first upper crystalline layer with a first buried porous silicon region underneath; wherein the first buried porous silicon region defines a taper between a first waveguide region of crystalline silicon having a first depth and a second waveguide region of crystalline silicon having a second depth which is smaller than the first depth.

19 Claims, 17 Drawing Sheets

(51) Int. Cl.
*G02B 6/13* (2006.01)
*G02B 6/136* (2006.01)

(52) U.S. Cl.
CPC .... *G02B 6/136* (2013.01); *G02B 2006/12061* (2013.01); *G02B 2006/12195* (2013.01)

(56) References Cited

U.S. PATENT DOCUMENTS

| | | | |
|---|---|---|---|
| 6,580,850 B1* | 6/2003 | Kazarinov | G02B 6/4201 |
| | | | 385/16 |
| 11,163,115 B1* | 11/2021 | Gehl | G02B 6/12004 |
| 11,966,078 B2* | 4/2024 | Yu | G02B 6/1228 |
| 2015/0338577 A1 | 11/2015 | Shi et al. | |
| 2016/0170142 A1 | 6/2016 | Lambert et al. | |
| 2016/0327759 A1* | 11/2016 | Keyvaninia | H01L 31/1035 |
| 2017/0160468 A1 | 6/2017 | Yanagisawa | |
| 2019/0285552 A1 | 9/2019 | Zhang et al. | |
| 2022/0155522 A1* | 5/2022 | Geiselmann | G02B 6/1228 |
| 2022/0214498 A1* | 7/2022 | Thomson | G02B 6/136 |
| 2023/0083043 A1* | 3/2023 | Scofield | G02B 6/131 |
| | | | 385/14 |

OTHER PUBLICATIONS

International Search Report and Written Opinion of the International Searching Authority, mailed May 14, 2021, corresponding to PCT/EP2021/053533, 11 pages.
U.K. Intellectual Property Office Examination Report, dated Mar. 22, 2022, for Patent Application GB2002071.5, 3 pages.
U.K. Intellectual Property Office Search Report, dated Jul. 29, 2020, for Patent Application No. GB2002071.5, 4 pages.
Zhang, J. et al., "Taper couplers for coupling between laser and silicon waveguide with large allowable tolerance", Proceedings of SPIE, Feb. 6, 2008, pp. 689909-1-689909-5, vol. 6899.

* cited by examiner

Side-view    Top-view

Side-view    Top-view

Side-view    Top-view

Side-view    Top-view

Side-view  Top-view

Side-view  Top-view

Side-view　　　Top-view

Side-view　　　Top-view

Side-view    Top-view

Side-view    Top-view

WAVEGUIDE PLATFORM

CROSS-REFERENCE TO RELATED APPLICATION(S)

This application is a U.S. national stage entry, under 35 U.S.C. § 371, of International Application Number PCT/EP2021/053533, filed on Feb. 12, 2021, which claims priority to British Patent Application Number 2002071.5, filed Feb. 14, 2020. The entire content of each of the applications identified in this paragraph is incorporated herein by reference.

FIELD

One or more aspects of embodiments according to the present invention relate to a waveguide platform and method of fabricating a waveguide platform on a silicon waver, and more particularly to a waveguide platform and method of fabricating a waveguide platform which comprises a taper between a first waveguide region having a first depth and a second waveguide region having a second depth which is smaller than the first depth.

BACKGROUND

Silicon photonic devices are often based upon a 3 µm thick waveguide platform. Such platforms have several advantages over waveguide platforms having a smaller waveguide size including lower optical losses, improved polarization dependence, and cost. In addition, it can be desirable for components to be built of a given size for ease of compatibility with other optical components.

On the other hand, it can be desirable for a photonic chip to include regions of smaller waveguides, particularly with sub-micron dimensions. These smaller waveguides have their own associated advantages; particularly for applications where speed is important since the smaller size facilitates faster operation.

In an ideal world, it is therefore desirable to be able to fabricate a single waveguide platform upon which larger waveguide regions and smaller waveguide regions can coexist. It is desirable for the top surface of smaller waveguides to be planar or substantially planar with the top surface of the smaller waveguides. It is also desirable for any mode conversion between the smaller and larger waveguides to be as efficient as possible.

SUMMARY

According to a first aspect of the present invention, there is provided a method of fabricating a waveguide platform on a silicon wafer; the method comprising:
providing a wafer having a layer of crystalline silicon;
lithographically defining a first region of the top layer;
electrochemically etching the waveguide platform to create porous silicon at the lithographically defined first region;
epitaxially growing crystalline silicon on top of the porous silicon to create a first upper crystalline layer with a first buried porous silicon region underneath;
wherein the first buried porous silicon region defines a taper between a first waveguide region of crystalline silicon having a first depth and a second waveguide region of crystalline silicon having a second depth which is smaller than the first depth.

Advantageously, the region of buried porous silicon has a well-controlled thickness. It has a refractive index which is lower than that of the crystalline silicon.

In this way, the fabrication method is capable of producing a single waveguide platform which contains both larger sized waveguides and smaller sized waveguides without significantly adding to the cost of fabrication. The method provided represents significant cost savings over alternatives such as ion slicing techniques.

Optional features of the invention will now be set out. These are applicable singly or in any combination with any aspect of the invention.

In one or more embodiments, the first waveguide region comprises a 3 µm waveguide platform. In those embodiments, the second waveguide region may comprise a 1 µm waveguide platform. In other embodiments, the first waveguide region may take the form of a 1 µm waveguide platform. In use, light may be provided to either of the first waveguide region or second waveguide region. For example, light may be provided to the first waveguide region and is converted via the taper to an optical mode supported by second waveguide region. Correspondingly, the transition may be from a 3 µm optical mode to a 1 µm optical mode. Alternatively, the light may be provided to the second waveguide region and is converted via the taper to an optical mode supported by the first waveguide region. Correspondingly, the transition may be from a 1 µm optical mode to a 3 µm optical mode. In other examples, the first waveguide region may comprise a 12 µm waveguide platform and the second waveguide region may comprise a 3 µm waveguide platform.

In one or more embodiments, the second waveguide platform comprises a sub-micron waveguide platform.

In one or more embodiments, the step of lithographically defining the first region comprises patterning a photoresist which acts as a mask during exposure of the platform to an electrochemical etch. The photoresist can also be used to pattern a dielectric layer, said dielectric layer then acting as a mask for the electrochemical etch. An example of a suitable etch is aqueous or ethanoic solutions of HF.

In one or more embodiments, when viewed along a direction which is perpendicular to the plane of the silicon wafer, the taper has a chevron shape.

In one or more embodiments, the method further comprises the additional steps of:
lithographically defining an additional region within the first upper crystalline layer;
electrochemically etching the waveguide platform to create porous silicon at the lithographically defined additional region;
epitaxially growing crystalline silicon on top of the porous silicon to create a second upper crystalline layer with a second buried porous silicon region underneath;
wherein the second buried porous silicon region defines an additional taper between the second waveguide region of crystalline silicon having a second depth and a third waveguide region of crystalline silicon having a third depth which is smaller than the second depth.

In this way, multi-level tapers can be created to transition between the largest waveguide present on the waveguide platform and the smallest waveguide present on the waveguide platform. This repeatability of the fabrication process gives rise to the ability to make multi-level tapers, without significantly adding to the cost of the ultimate device.

In one or more embodiments, the second waveguide region forms an intermediate taper.

In one or more embodiments, when viewed along a direction which is perpendicular to the plane of the silicon wafer, the intermediate taper has a chevron shape.

In one or more embodiments, the third waveguide platform comprises a sub-micron waveguide platform.

In one or more embodiments, the second buried porous silicon region lies on top of the first buried porous silicon region.

In one or more embodiments, the second buried porous silicon region lies directly on top of the first buried porous silicon region in that the lower surface of the second buried porous silicon region is entirely contiguous with at least a portion of the upper surface of the first buried porous silicon region.

In one or more embodiments, the second buried porous silicon region is separated from the first buried porous silicon region by a layer of crystalline silicon which lies between the lower surface of the second buried porous silicon region and at least a portion of the upper surface of the first buried porous silicon region.

According to a second aspect of the present invention, there is provided a tapered waveguide platform on a silicon wafer; the tapered waveguide platform comprising:
a first waveguide region of crystalline silicon having a first depth;
a second waveguide region of crystalline silicon having a second depth which is smaller than the first depth;
a taper formed from crystalline silicon, the taper located in-between the first waveguide region and the second waveguide region and the shape of the taper being entirely defined by a buried layer of porous silicon within the crystalline silicon which forms both the first waveguide region and the second waveguide region.

In one or more embodiments, the first waveguide region comprises a 3 μm waveguide platform.

In one or more embodiments, the second waveguide platform comprises a sub-micron waveguide platform.

In one or more embodiments, when viewed along a direction which is perpendicular to the plane of the silicon wafer, the taper has a chevron shape.

In one or more embodiments, the tapered waveguide platform further comprises:
a second buried porous silicon region which defines an additional taper located between the second waveguide region of crystalline silicon having a second depth and a third waveguide region of crystalline silicon having a third depth which is smaller than the second depth.

In this way, the additional taper forms a taper within an intermediate region of the waveguide platform such that, when viewed as a cross section through the wafer, the porous silicon material forms two steps, a first step corresponding to the taper in-between the first waveguide region and the second region; and the second step corresponding to the additional taper in-between the second waveguide region and the third waveguide region, the third waveguide region laying the closest to the upper surface of the waveguide platform and the first waveguide region extending for the greatest depth within the waveguide platform. In such embodiments, the second waveguide region forms an intermediate waveguide region. Typically this intermediate region functions to aid the mode matching between the first waveguide region and the third waveguide portion.

In one or more embodiments, when viewed along a direction which is perpendicular to the plane of the silicon wafer, the intermediate taper has a chevron shape.

In one or more embodiments, the third waveguide platform comprises a sub-micron waveguide platform.

Further optional features of the invention are set out below.

BRIEF DESCRIPTION OF THE DRAWINGS

Embodiments of the invention will now be described by way of example with reference to the accompanying drawings in which.

DETAILED DESCRIPTION

Figure 1A:
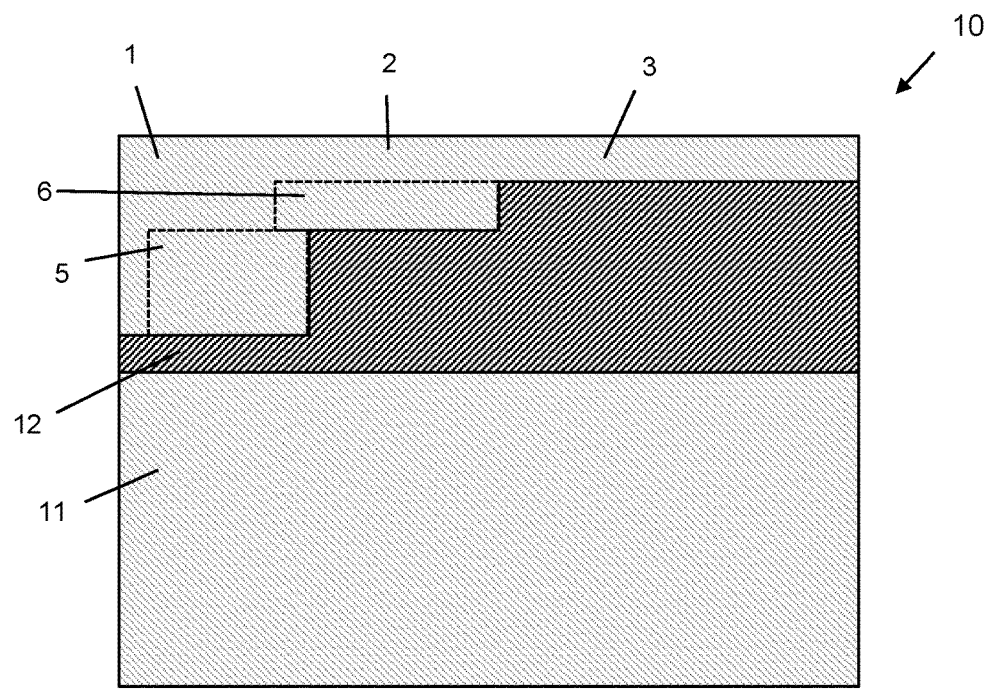
FIGS. 1A and 1B show a side view and top view respectively of a waveguide platform according to an embodiment of the present invention.

The detailed description set forth below in connection with the appended drawings is intended as a description of exemplary embodiments of a waveguide platform and a method of fabricating a waveguide platform provided in accordance with the present invention and is not intended to represent the only forms in which the present invention may be constructed or utilized.

A first embodiment is described below with reference to FIGS. 1A, 1B and FIGS. 2A-2G where like reference numerals are used to denote common features.

The waveguide platform 10 is made up of a first waveguide region 1 of crystalline silicon having a first depth; a second waveguide region 2 of crystalline silicon having a second depth which is smaller than the first depth; and a third waveguide region 3 of crystalline silicon having a third depth which is smaller than the first depth and also smaller than the second depth.

A taper 5 formed from crystalline silicon is located in-between the first waveguide region 1 and the second waveguide region 2. A further taper 6 formed from crystalline silicon is located in-between the second waveguide region 2 and the third waveguide region 3.

Each of the two tapers has a shape which is entirely defined by a respective underlying region buried porous silicon within the crystalline silicon. The tapers act to match the mode of input light 7 into the larger first waveguide 1 with the mode of the output light 8 from the smallest waveguide 3 which has the most shallow depth. Each of the first, second and third waveguides share the same planar upper surface. Their respective lower surfaces are defined by the upper surfaces of the stepped porous silicon layers which lie beneath them.

The tapered waveguide platform 10 is formed on a silicon starting wafer, the silicon wafer in this case, initially being made up of a base silicon substrate 11 with a pre-formed porous layer 12 on top of the base silicon substrate and a crystalline top layer 13 on top of the pre-formed porous layer. The preformed porous layer may have a thickness of, for example, 0.4 μm.

When viewed from above, that is to say, when viewed along a direction which is perpendicular to the plane of the silicon wafer, each taper has a chevron shape, the point of the chevron pointing towards the smallest waveguide region 3 having the shallowest depth.

Figure 1B:
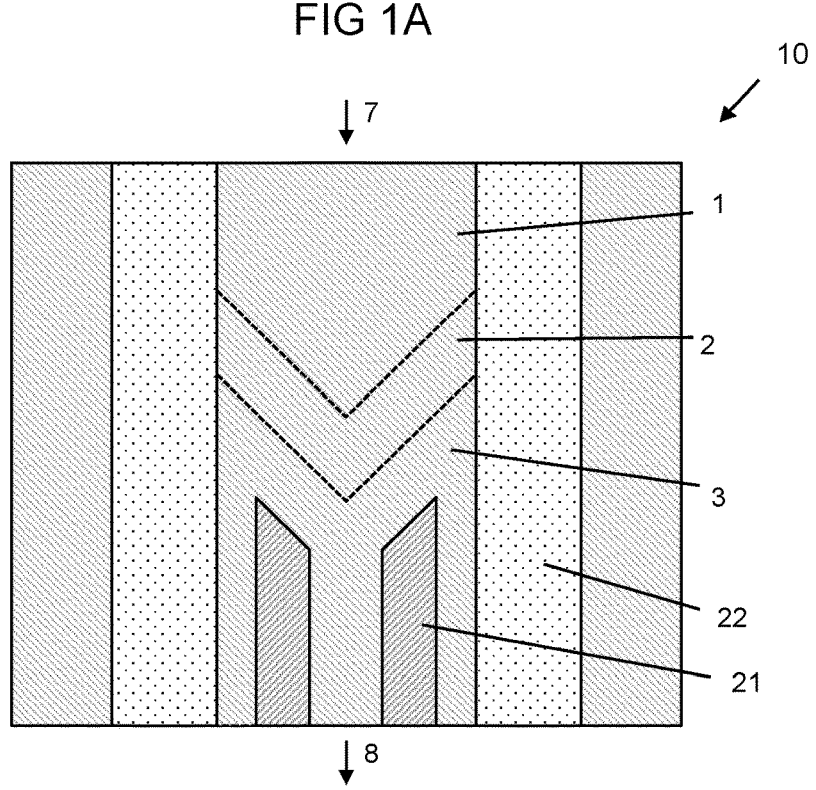

The silicon starting wafer is processed by repeated lithography and etching steps to generate the waveguide platform shown in FIGS. 1A and 1B.

Initially, the starting wafer is provided, having a top layer of crystalline silicon 13. This top layer is irradiated using lithography to define a first region having a particular shape. This lithography can be performed by using any one of: photolithography; nanoimprint lithography; or electron-beam lithography. Alternative techniques can be used, so long as a shape is defined in a dielectric layer which blocks current during the electrochemical etch. Typically photolithography is used and a relatively short wavelength is used to provide the appropriate level of resolution.

Figure 2A:
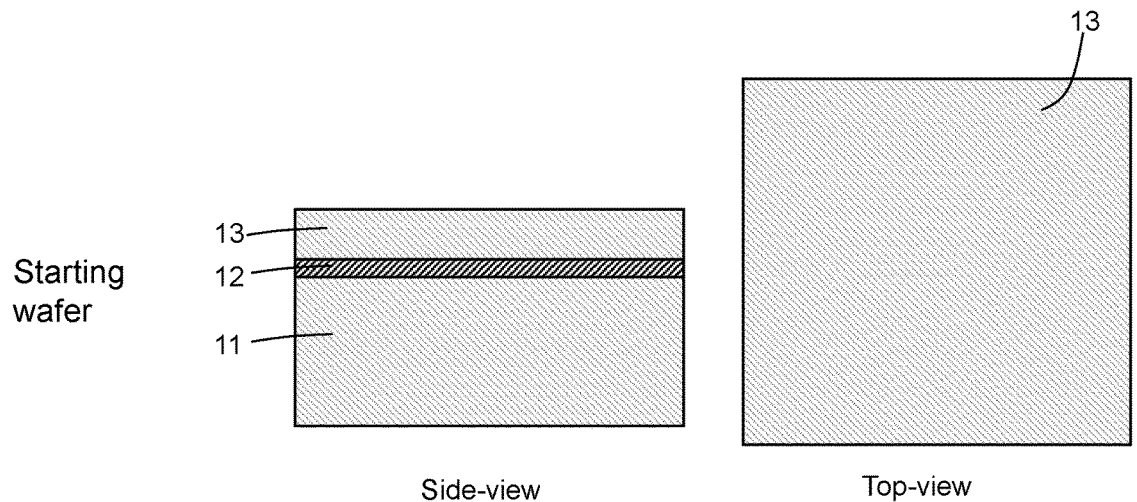
FIGS. 2A-2G depict example fabrication steps for the fabrication of the waveguide platform shown in FIGS. 1A and 1B.
Figure 2B:
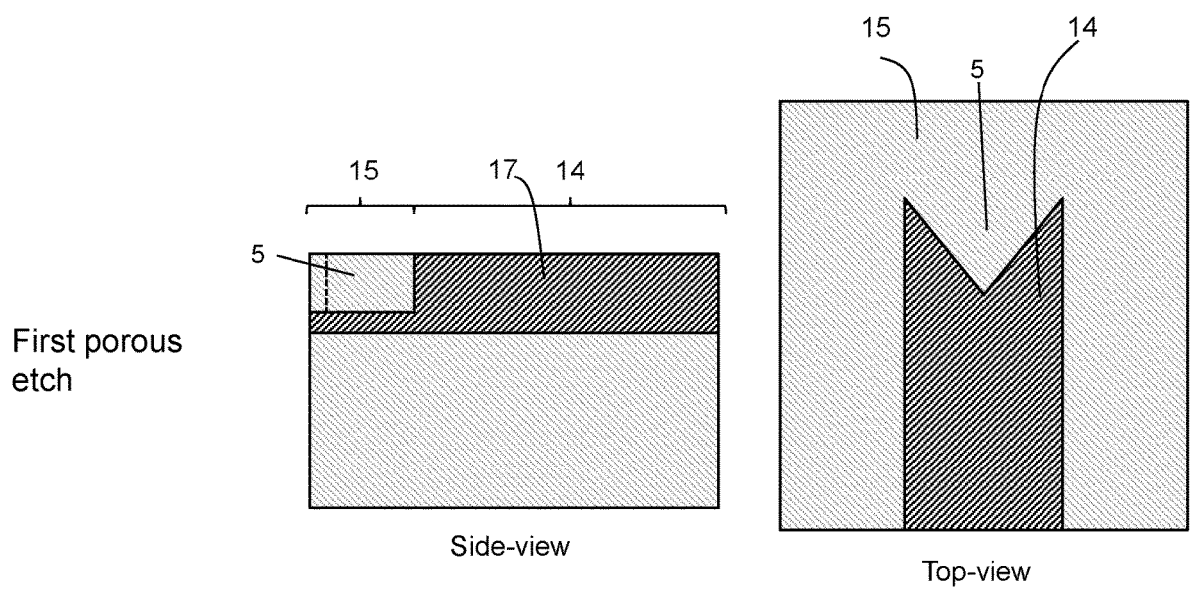

As can be seen from FIG. 2B, an electrochemical etch is carried out on the waveguide platform to create porous silicon 17 at the lithographically defined first region 14. In more detail, the shape of region 14 is initially patterned in a photoresist as discussed above. This region is open, so that the silicon in region 13 is exposed to the electrochemical solution when applied. This allows a current to flow from the electrochemical solution through regions 13 and 11 to an electrode on the bottom of region 11. This current drives the electrochemical etch. Specific porosity and verticality of the electrochemical etch are controlled by the current density and concentration of the etchant (e.g. HF) in the solution. The lithographic process enables a porous structure of virtually any shape to be created by simply changing the lithography pattern. The first porous region may have a thickness of, for example, 2 μm or less. The remaining, non-porous regions form the tapers of the waveguide platform. In the embodiments shown, the shape of the tapers are chosen to be chevron-like (when viewed from above) with the point of the chevron pointing away from what will become the input waveguide 7 having a larger depth, towards the output waveguide 8 having the shallowest depth.

Figure 2C:
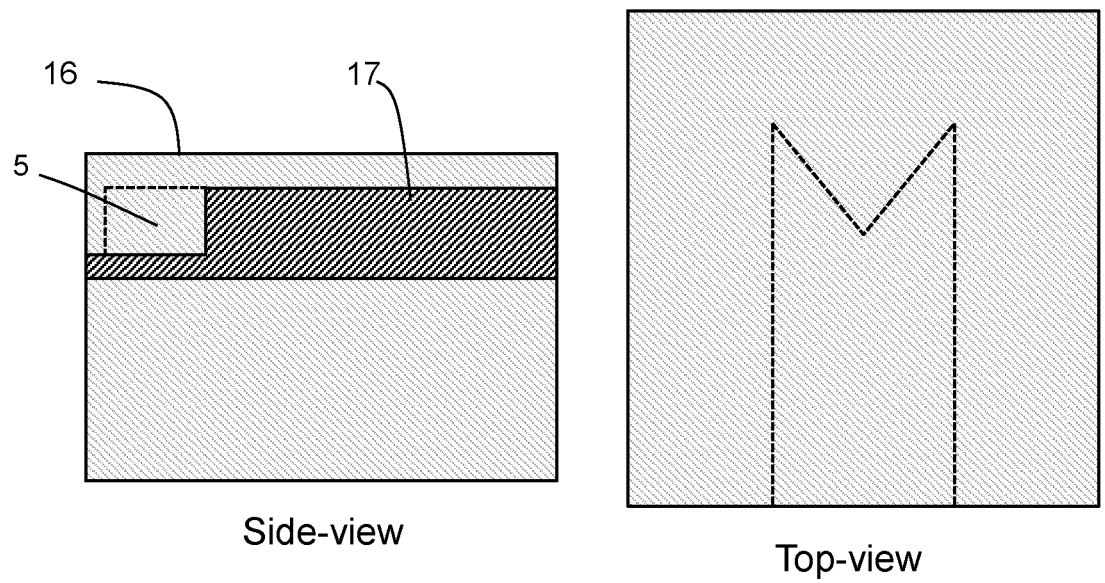

Following the etch, as shown in FIG. 2C, a layer of crystalline silicon 16 is epitaxially grown on top of the porous silicon layer 17 and also on top of any regions of crystalline silicon lying outside of the lithographically defined first region 14. This first upper crystalline layer 16 creates a first buried porous silicon region underneath, in this case acting to define a taper between the first waveguide region and what will become the second waveguide region 2 (in this case an intermediate waveguide region). In examples where the transition to be fabricated is one from a 3 μm waveguide to a 1 μm waveguide, the steps discussed with relation to FIGS. 2F and 2G below would be skipped.

Figure 2D:
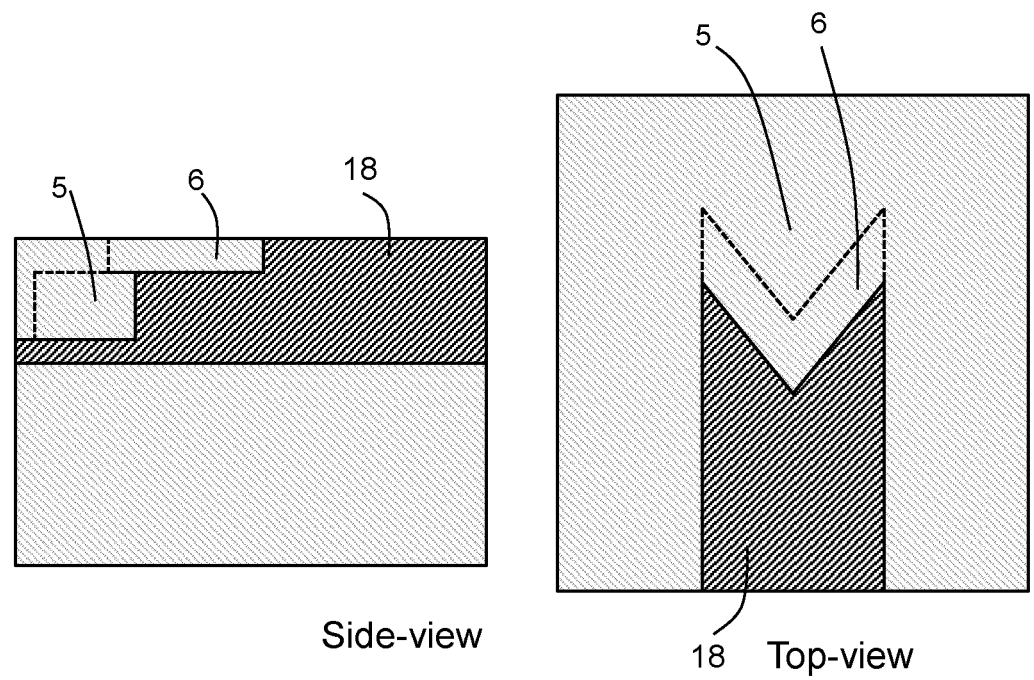

As shown in FIG. 2D, a further lithography step and electrochemical etch is carried out on the waveguide platform, this time on the first upper crystalline layer to create porous silicon at a defined region within the first upper crystalline layer. Again, the remaining, non-porous region which lies within the same plane as the newly created porous layer forms a taper of the waveguide platform. In the embodiments shown, the shape of the tapers are chosen to be chevron-like (when viewed from above) with the point of the chevron pointing away from what will become the input waveguide 7 having a larger depth, towards the output waveguide 8 having the shallowest depth.

Figure 2E:
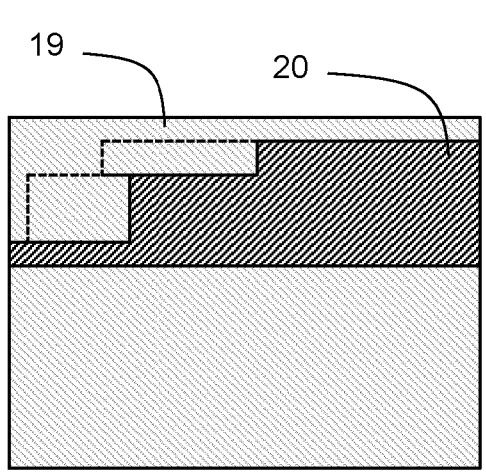
Figure 2E:
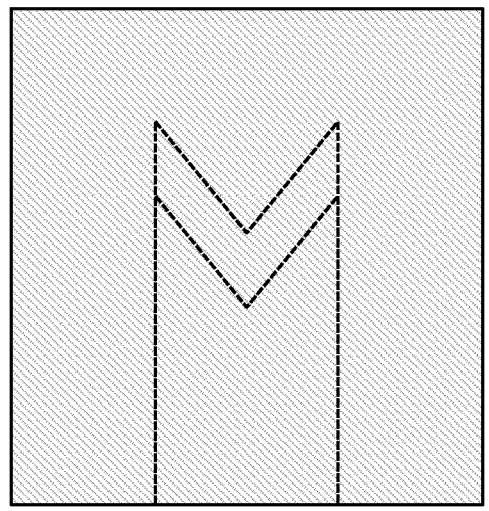

Following the etch, as shown in FIG. 2E, a second upper layer of crystalline silicon 19 is epitaxially grown on top of the first crystalline layer 16, which includes any areas that have been etched to form porous regions and also any areas which remain as crystalline silicon. This second upper crystalline layer 19 creates a second buried porous silicon region 20 underneath, and in this case, the second buried porous region acts to define a taper between the second waveguide region 2 and what will become the third waveguide region 3. The second buried porous silicon region lies directly on top of the first buried porous silicon region in that the lower surface of the second buried porous silicon region is entirely contiguous with at least a portion of the upper surface of the first buried porous silicon region. The second porous region may have a thickness, for example, of 0.78 μm or less.

Figure 2F:
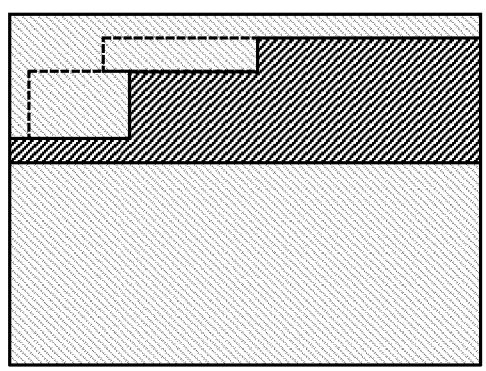
Figure 2F:
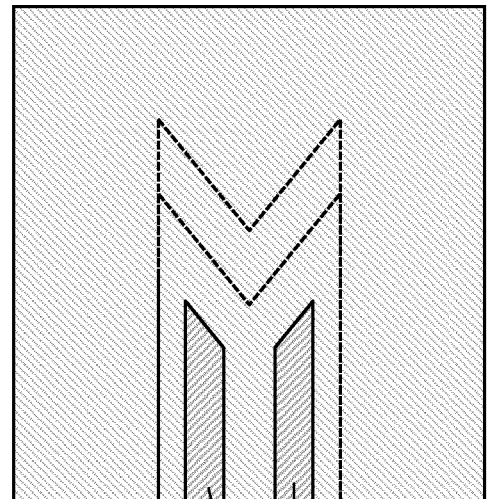

As shown in FIG. 2F, the second upper layer of crystalline silicon is then processed to form the desired small waveguide structure, e.g. a rib waveguide, by carrying out a shallow etch 21. This may be carried out by a standard etching technique for silicon waveguides.

Figure 2G:
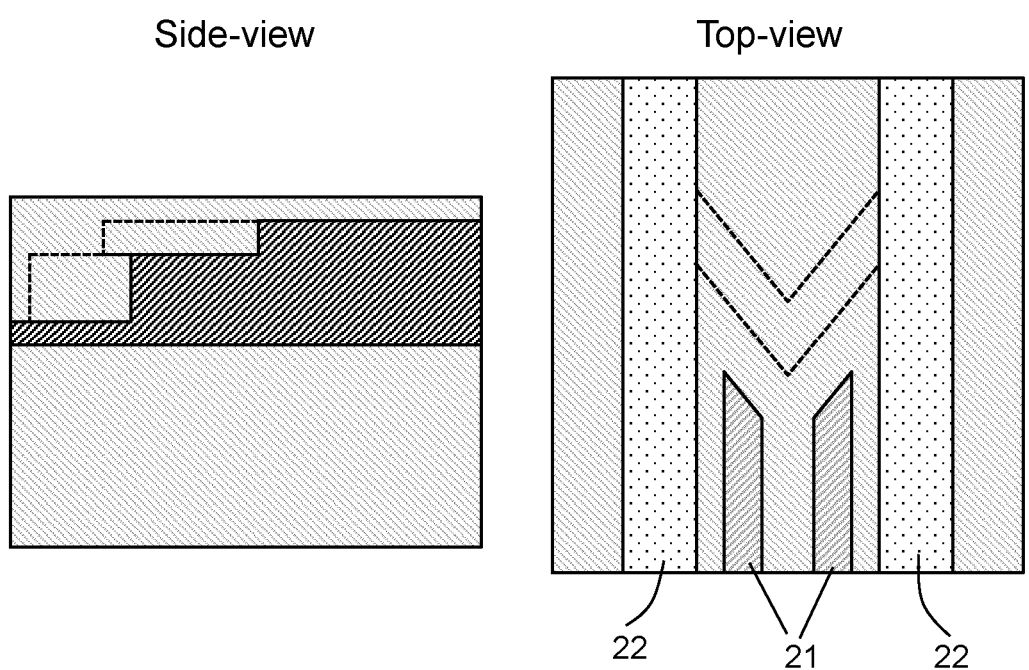

As shown in FIG. 2G, the waveguide platform is then processed to form the desired shape of the large waveguide, this will be carried out by a deep etch 22, which extends down to the base of the crystalline silicon which makes up the first waveguide portion 1. Again, this may be carried out by any standard etching technique for silicon waveguides.

An alternative embodiment is described below with reference to FIGS. 3A and 3B as well as FIGS. 4A-4G, where like reference numerals are used to denote features already described above with reference to the embodiment shown in FIGS. 1A, 1B and FIGS. 2A-2G.

The embodiment of FIGS. 3A, 3B and FIGS. 4A-4G differ from the earlier described embodiment in that the first buried porous silicon region 17 is separated from the pre-formed porous silicon layer 12 by a layer of crystalline silicon 101, preferably a thin layer. The exact thickness of the thin layer is dependent on the size of the waveguides in the first and second regions. For example, if the thickness of the waveguide in region 2 is 1 μm, the thickness of region 102 should be substantially less so that the optical mode is "pushed" up into region 2 in the tapered region 5. From a purely design perspective, this would mean that region 102 has a thickness which is less than half of the thickness of region 2. However, in practice, it would be even thinner so as to account for fabrication variations. The second buried porous silicon region 18 is separated from the first buried porous silicon region 17 by a layer of crystalline silicon 102 which lies between the lower surface of the second buried porous silicon region and at least a portion of the upper surface of the first buried porous silicon region.

Figure 5A:
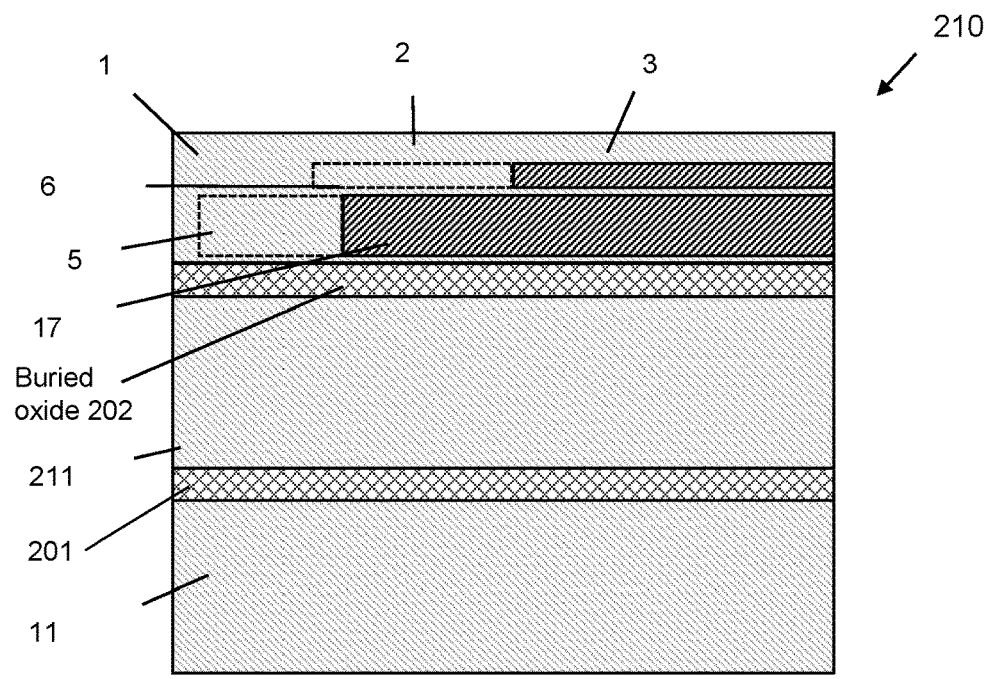
FIGS. 5A and 5B show a side view and top view respectively of a waveguide platform according to an alternative embodiment of the present invention.
Figure 5B:
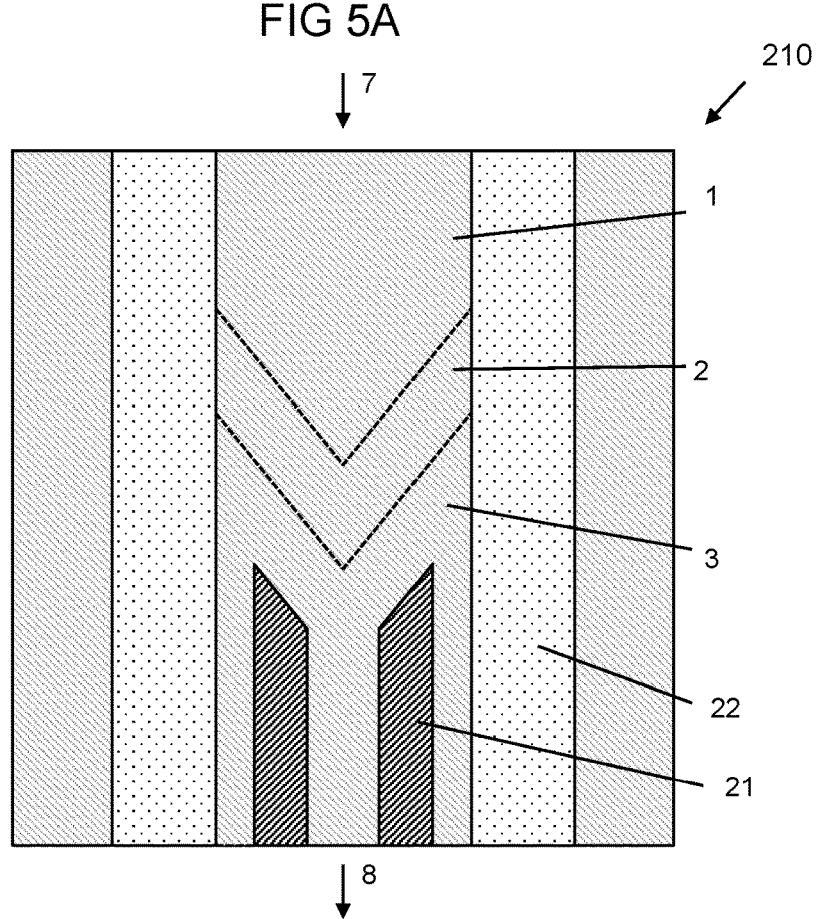

An alternative embodiment is described below with reference to FIGS. 5A and 5B as well as FIGS. 6A-6H, where like reference numerals are used to denote features already described above with reference to the embodiments shown in FIGS. 1A, 1B, FIGS. 2A-2G, FIGS. 3A, 3B, and FIGS. 4A-4G.

The embodiment of FIGS. 3A, 3B and FIGS. 4A-4G differ from the earlier described embodiment in that the starting substrate is different. In this embodiment, the starting substrate is made up of an initial substrate 11 of crystalline silicon. A first buried oxide (BOX) layer 201 lies on top of the base silicon layer and an intermediate crystalline silicon layer 211 lies on top of the first BOX layer 201. A second BOX layer 202 lies directly on top of the intermediate crystalline layer 211, and an upper crystalline silicon layer lies on top of the second BOX layer.

Figure 6A:
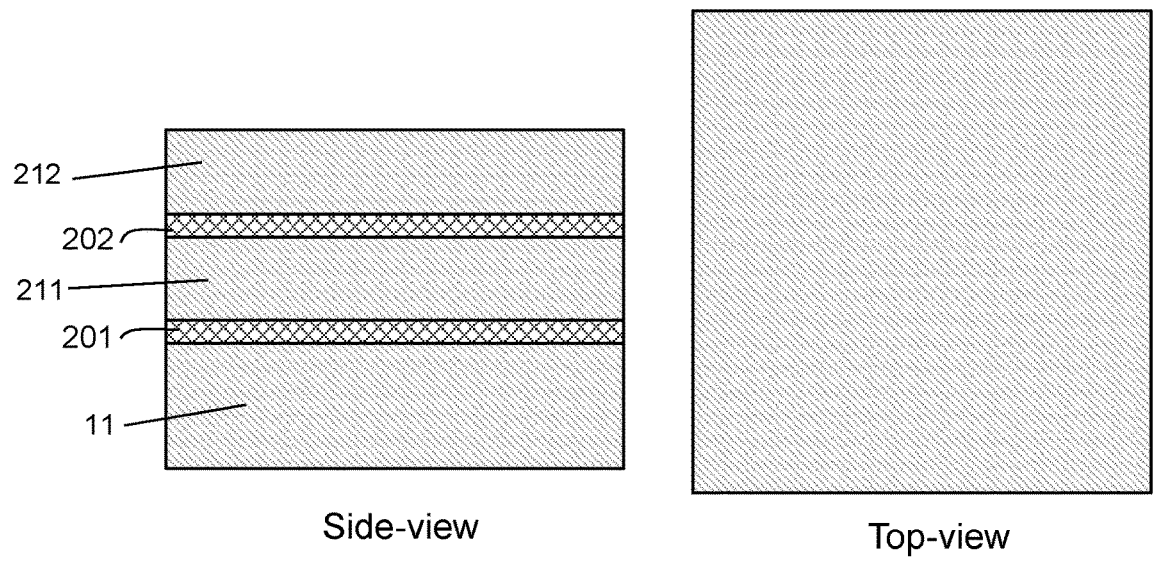
FIGS. 6A-6H depict example fabrication steps for the fabrication of the waveguide platform shown in FIGS. 5A and 5B.
Figure 6B:
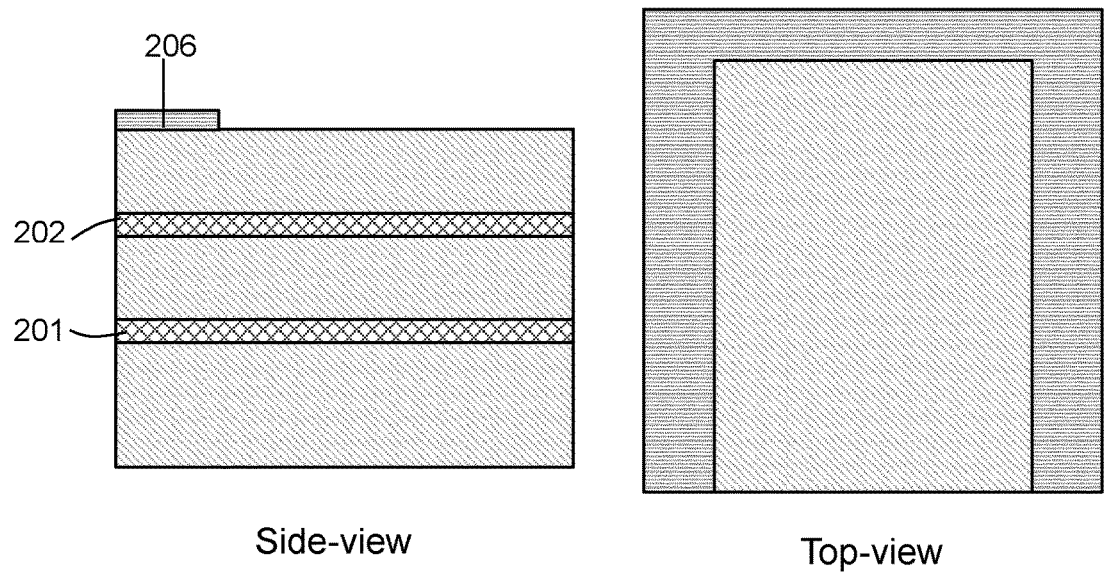
Figure 6C:
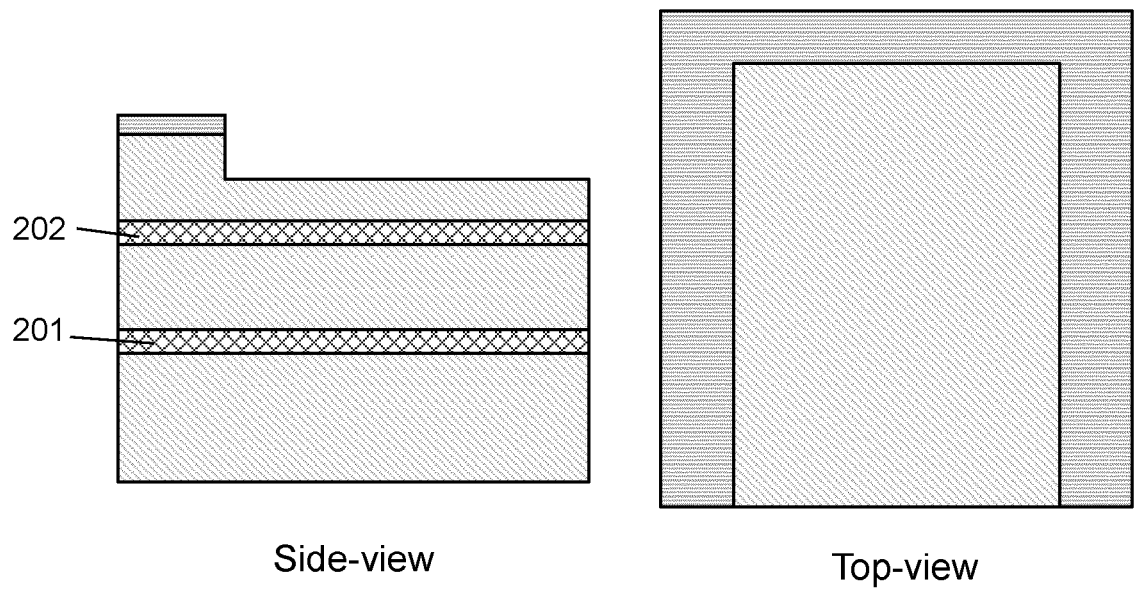
Figure 6D:
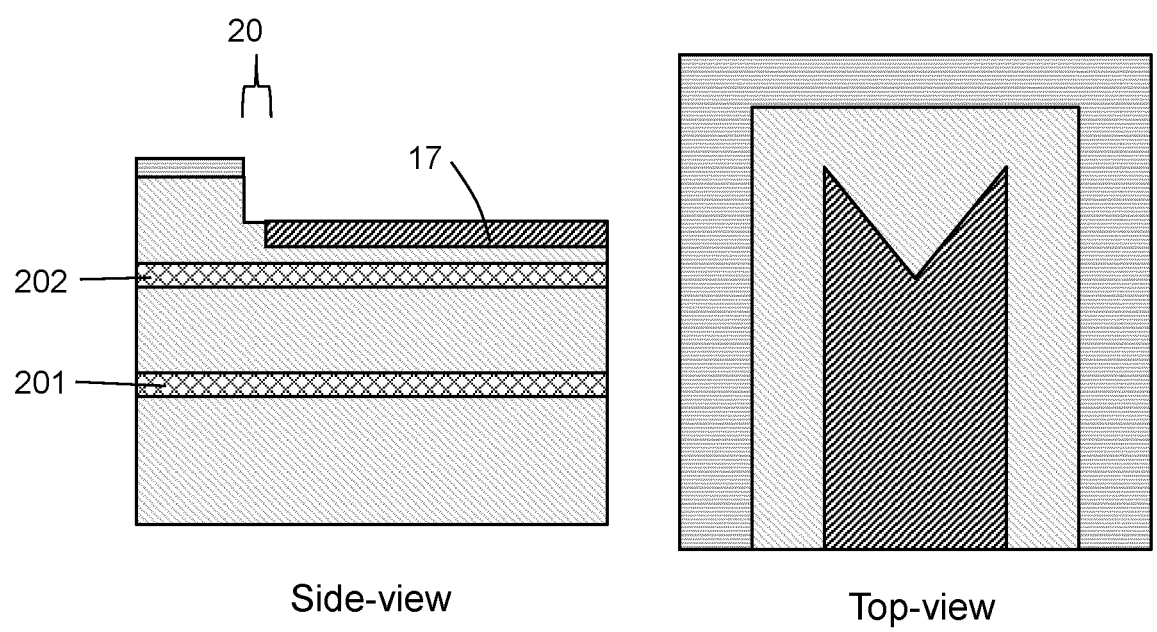
Figure 6E:
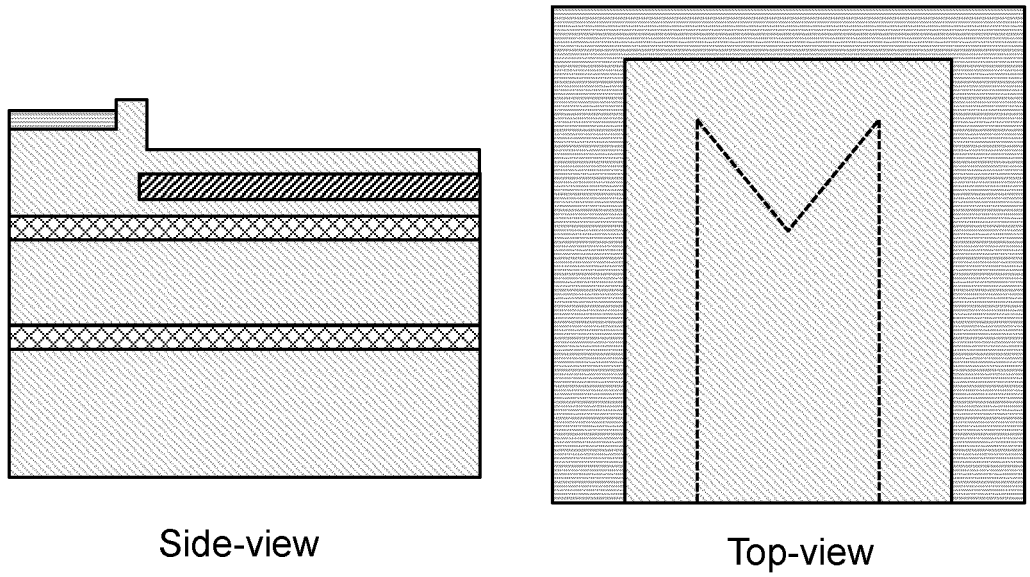
Figure 6F:
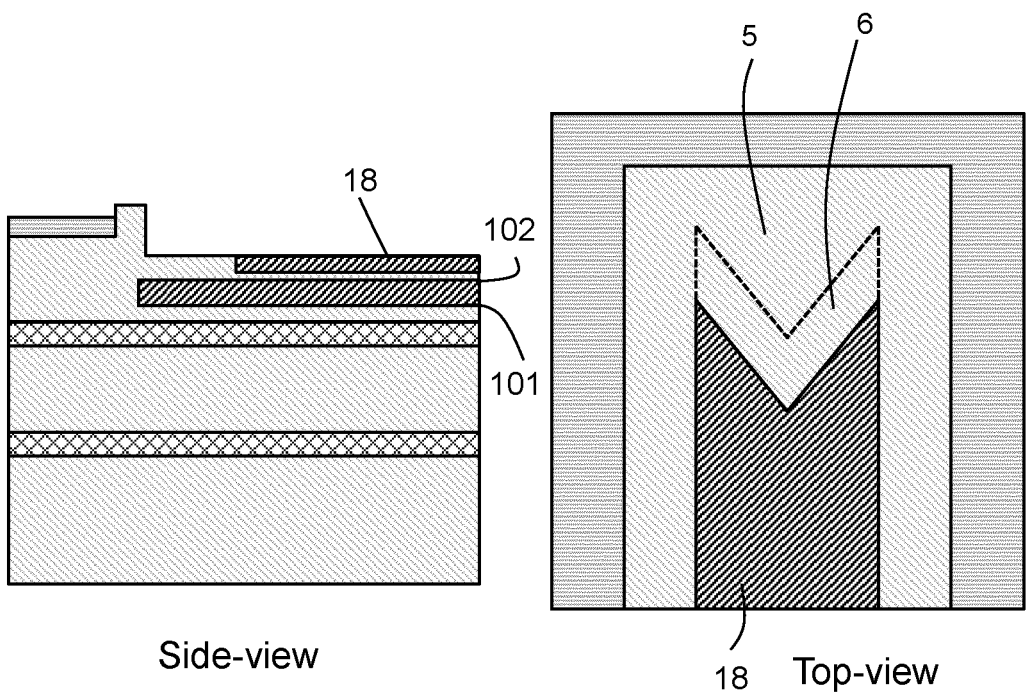

As can be seen in FIGS. 6B and 6C, this embodiment requires an extra step of performing a partial etch of the upper crystalline layer 212 in order to reduce its thickness above the second BOX layer 202. Typically, this process step will include deposition of a suitable resist 206. The first and second porous layers are then generated as described above in relation to other embodiments. As can be seen in FIG. 6D, the lithographically defined region within which the first porous silicon region is created, is smaller than the area which has been partially etched. This gives rise to a clearance 204 between the edge of the porous silicon region 17 and the sidewall created by the partial etch of the upper crystalline silicon layer 212. During fabrication of the device, where crystalline layers are epitaxially grown onto layers of porous silicon and crystalline silicon alike, crystalline silicon will build up as shown in FIG. 6G within this clearance region 204.

Figure 6G:
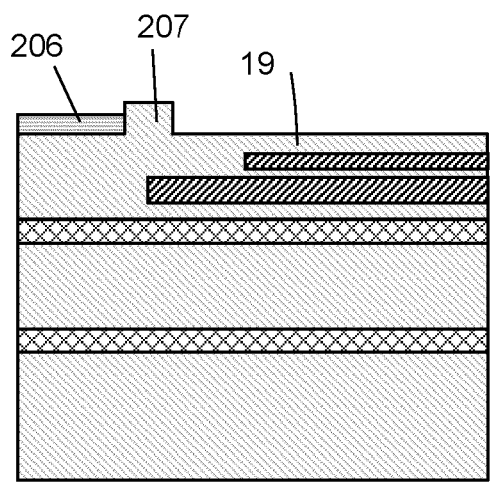
Figure 6G:
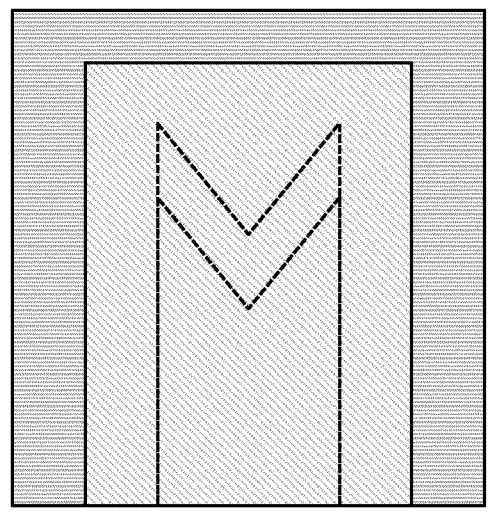
Figure 6H:
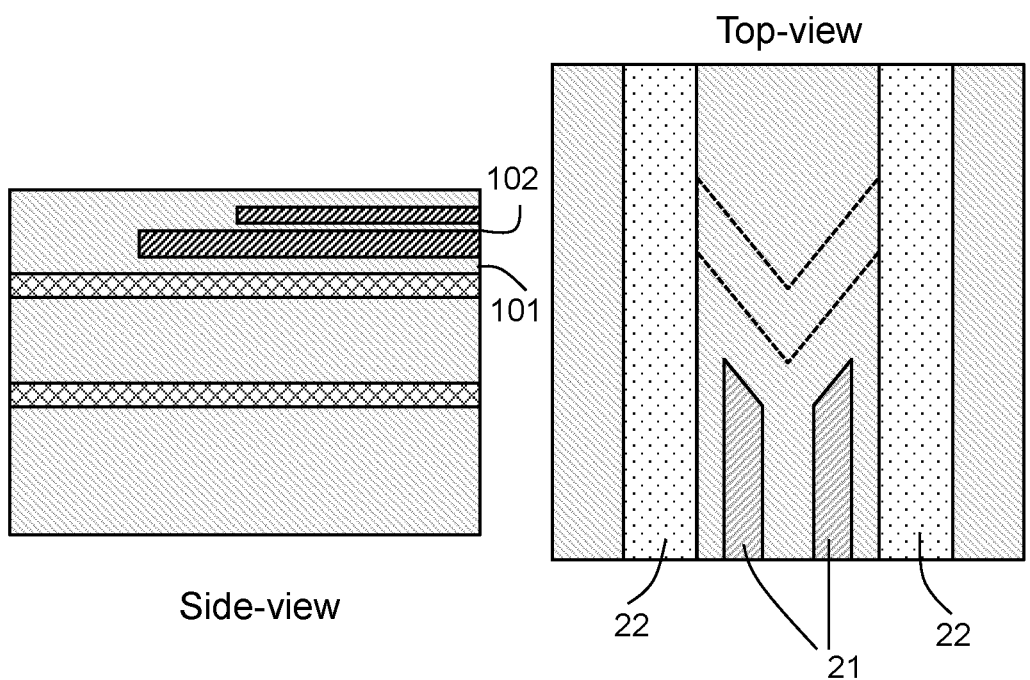

In-between the step of epitaxially growing the uppermost crystalline layer 19 (as shown in FIG. 6G) and the step of creating the waveguides by deep and shallow etches (as shown in FIG. 6H), an additional fabrication step is carried out to planarize the uppermost surface of the waveguide platform, thereby removing any resist 206 that may be present, or any excess build-up of crystalline silicon and creating a single planar surface.

Figure 3A:
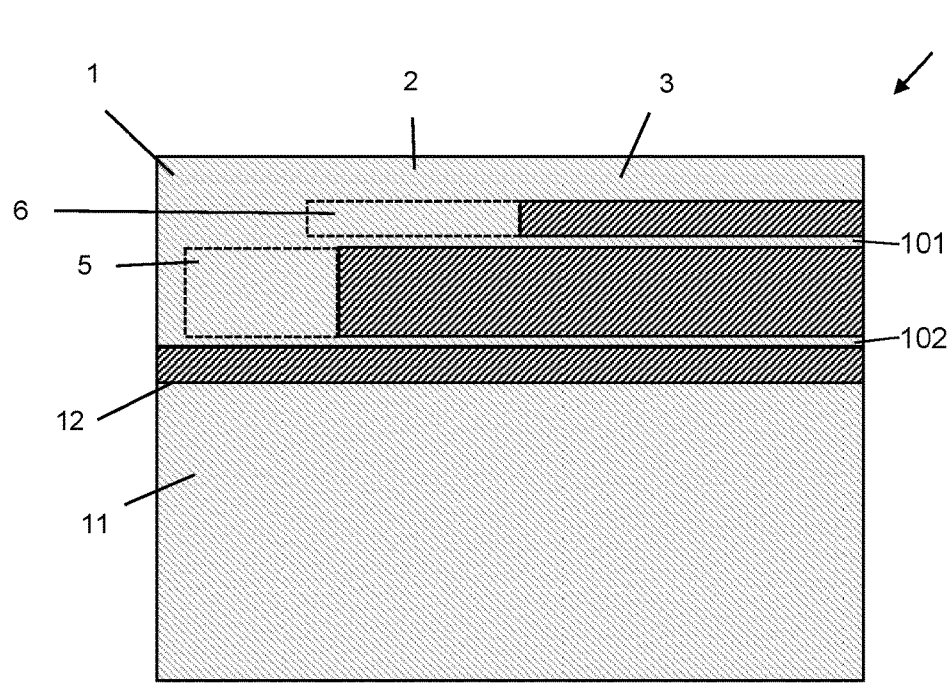
FIGS. 3A and 3B show a side view and top view respectively of a waveguide platform according to an alternative embodiment of the present invention.
Figure 3B:
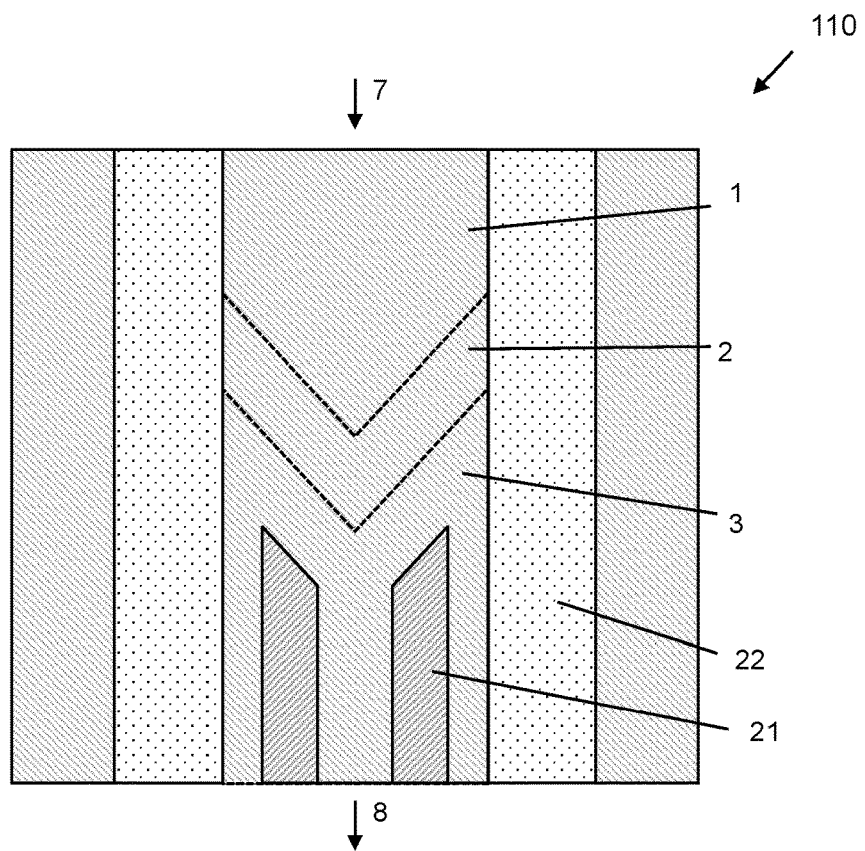
Figure 4A:
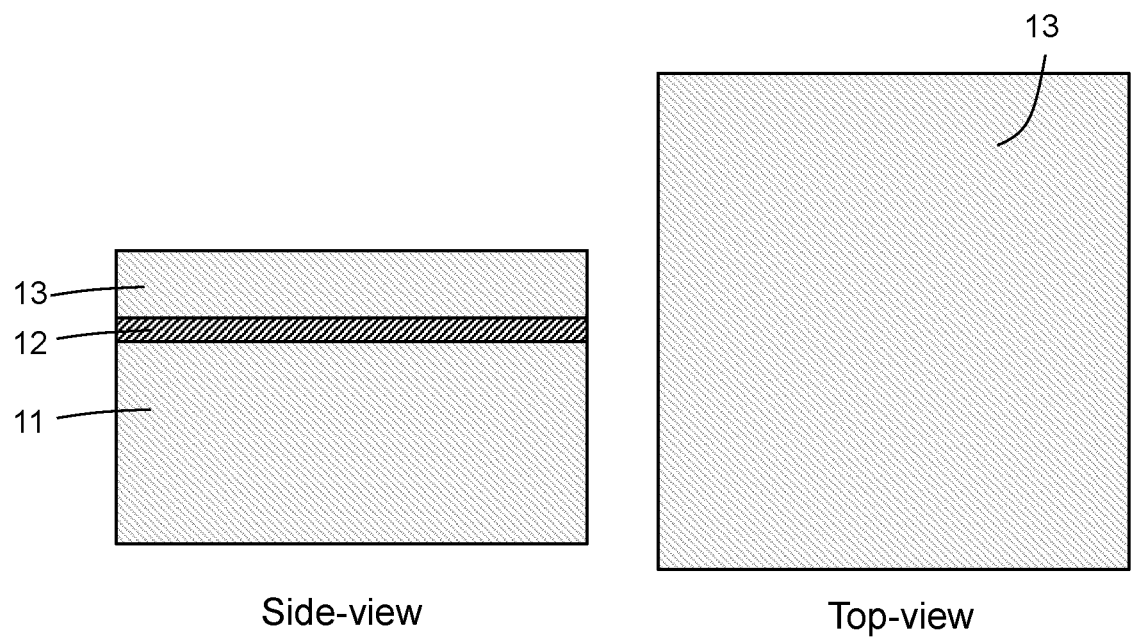
FIGS. 4A-4G depict example fabrication steps for the fabrication of the waveguide platform shown in FIGS. 3A and 3B.
Figure 4B:
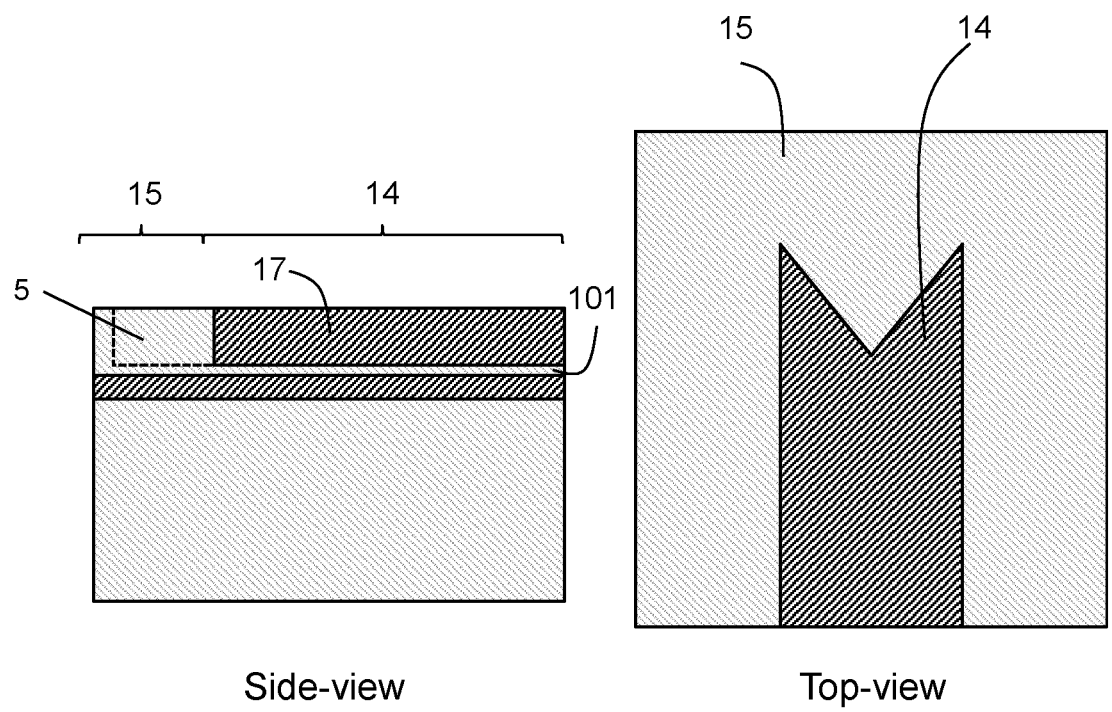
Figure 4C:
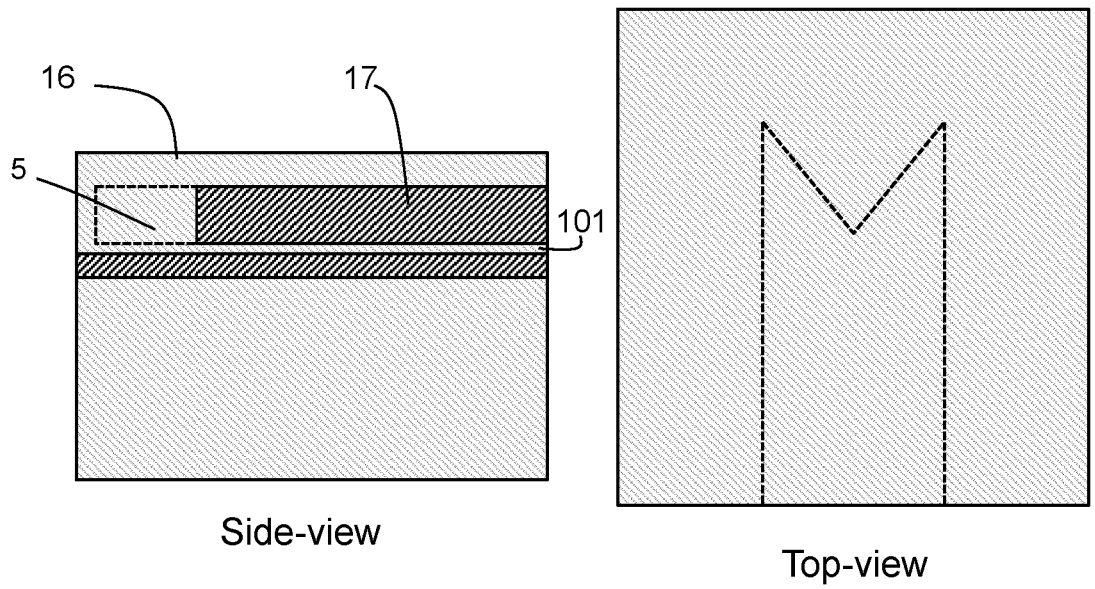
Figure 4D:
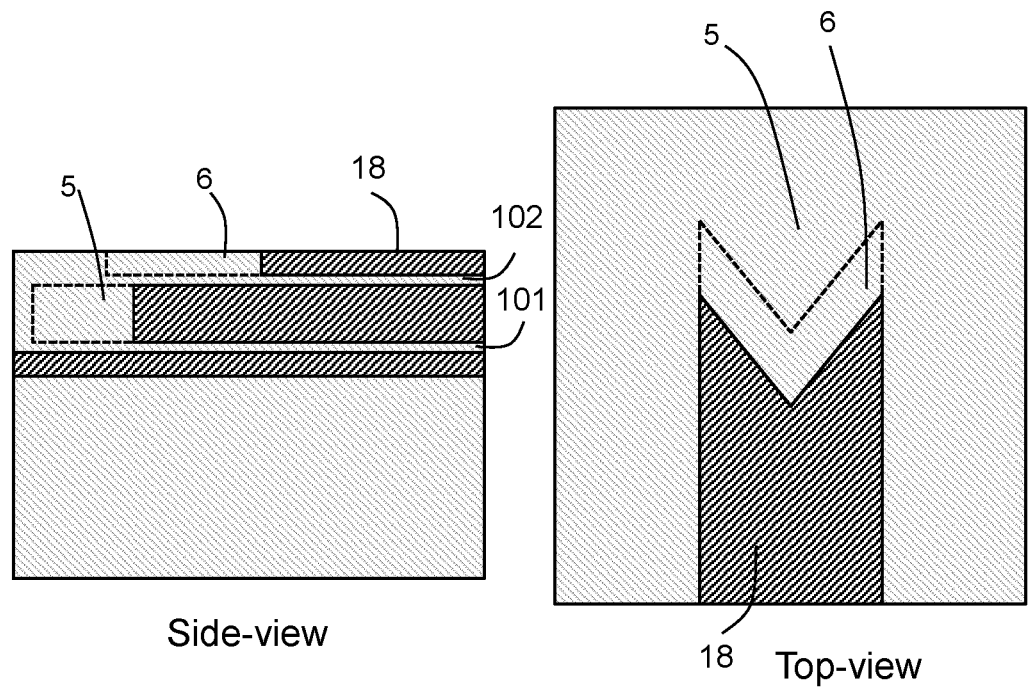
Figure 4E:
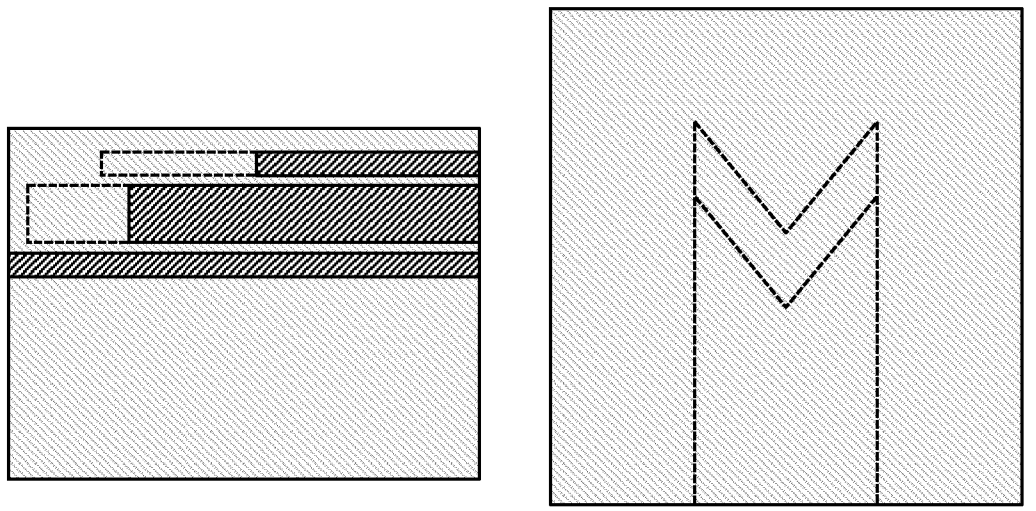
Figure 4F:
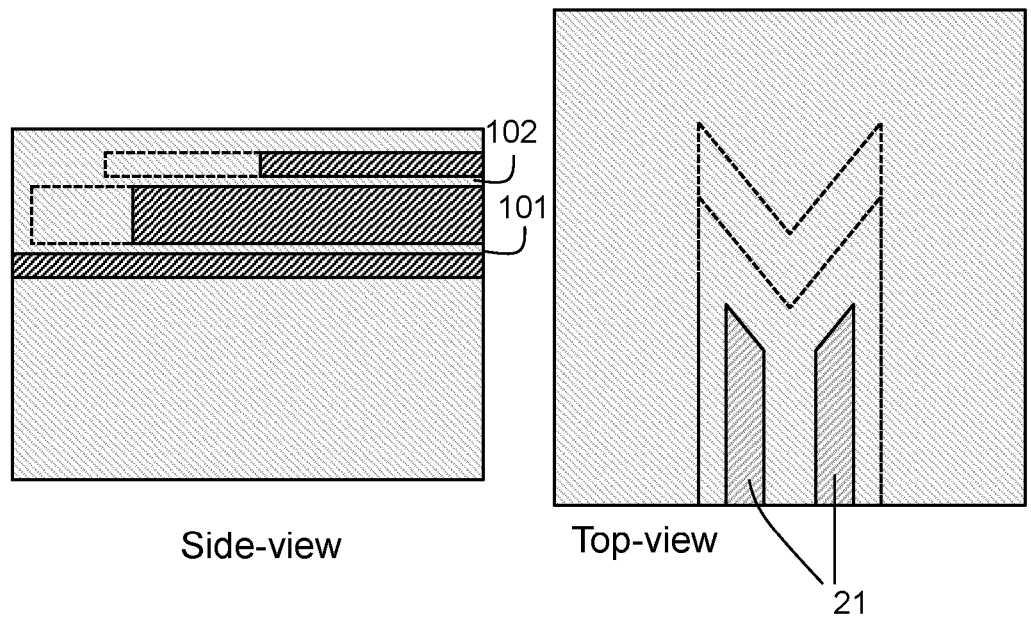
Figure 4G:
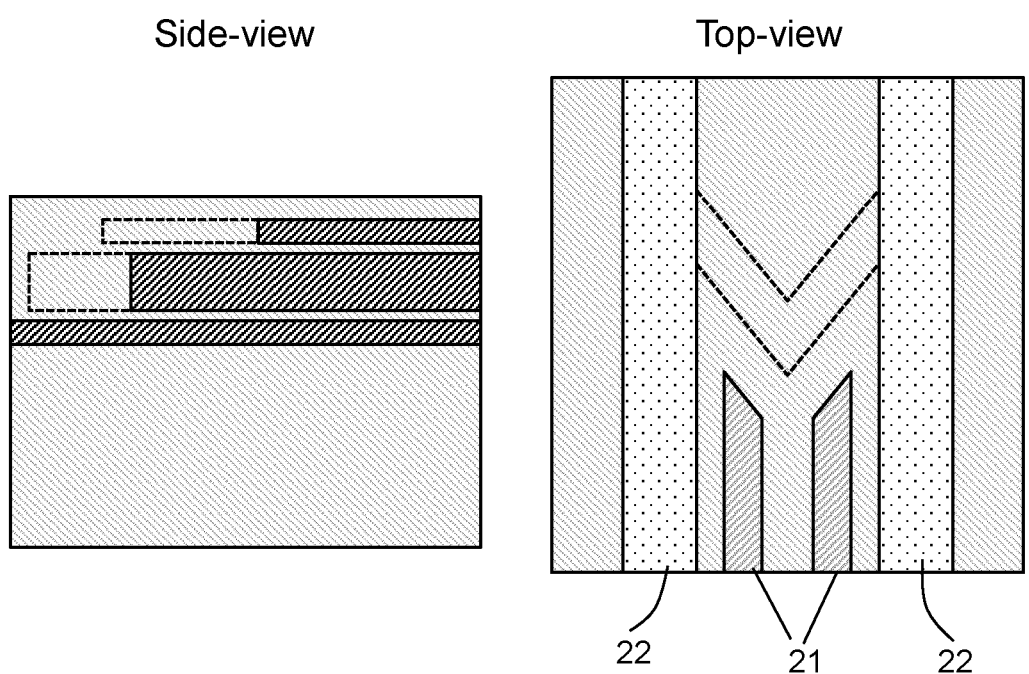

The embodiment described above in relation to FIGS. 5A and 5B includes extra crystalline layers 101, 102 as are also present in the embodiment shown in FIGS. 3A and 3B. However, it is envisaged that the direct porous contact found in FIGS. 1A and 1B could equally be applied to the starting substrate shown in FIG. 6A.

In any of the embodiments described above, the input waveguide 7 may have a depth of 3 µm and the output waveguide 8 may have a depth of 0.22 µm. The intermediate taper region 2 may have a depth of 1 µm. In all cases, these depths are taken from the uppermost surface of the waveguide platform, which is a single planar surface which includes the upper surface of each of the first waveguide region 1, the second waveguide region 2 and the third waveguide region 3.

Although the embodiments described above all comprise a stepped, double taper structure, it is envisaged that a single taper platform could also be fabricated using the methods described above, only without a repetition of the steps of creating a buried porous layer, since a single taper could be generated with only one buried porous layer.

Figure 7:
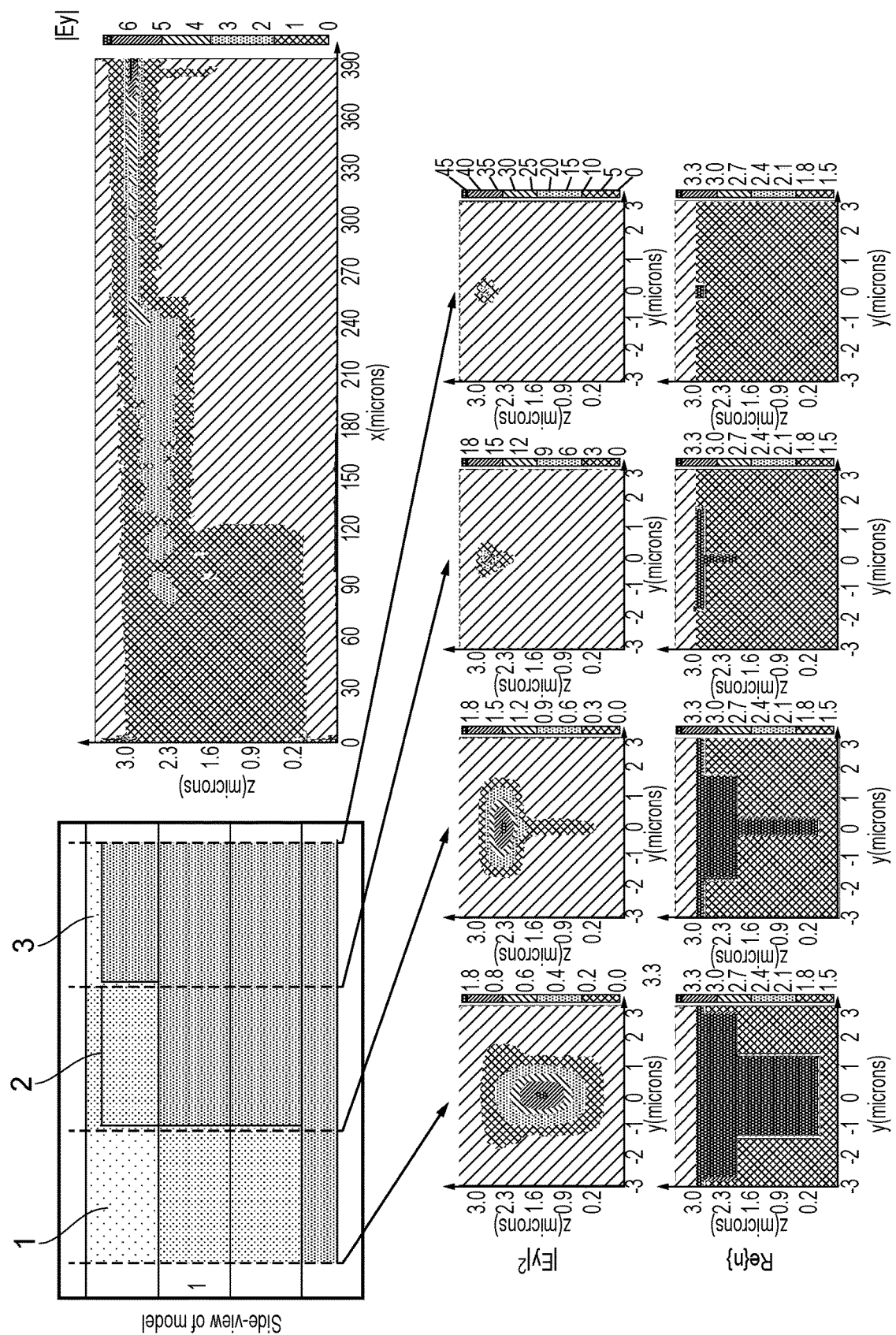
FIG. 7 shows a model of a mode conversion using the waveguide platform of an embodiment of the present invention.

FIG. 7 depicts a model showing mode conversion along the waveguide from the larger region, through the intermediate taper region and onwards to the smaller waveguide region. The lower panels show the modes at each intersection between two different waveguide regions.

Figure 8A:
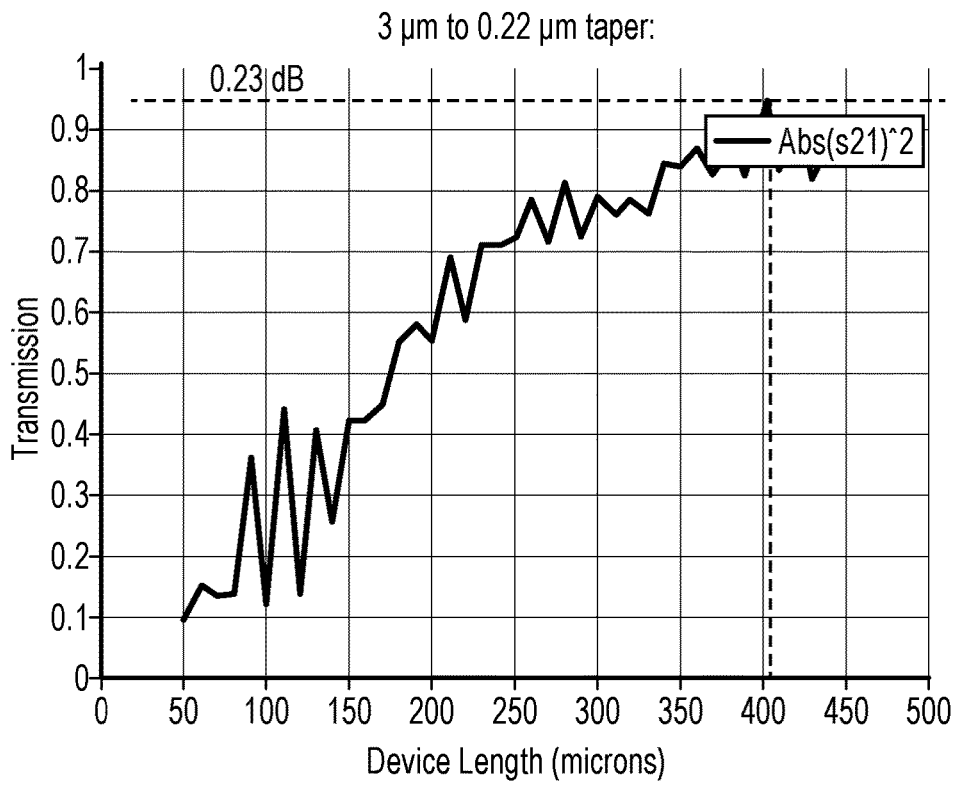
FIG. 8A shows a plot of transmission vs. device length for a 3 μm to 0.22 μm taper and and 8B shows a plot of transmission vs. device length for a 1 μm to 0.22 μm.
Figure 8B:
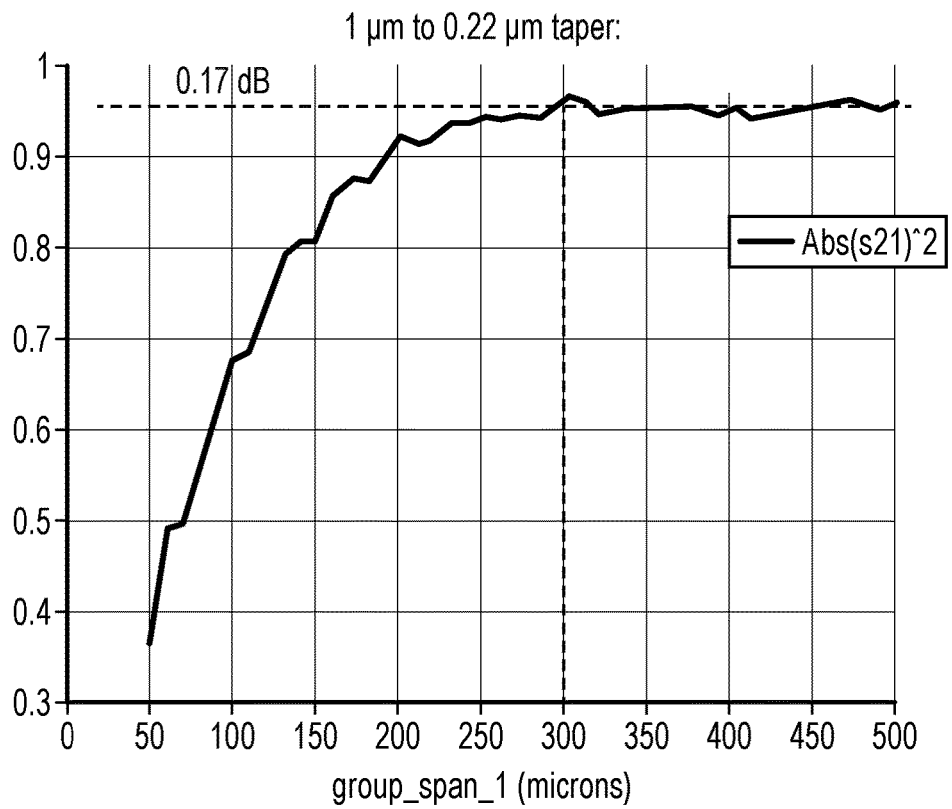

FIG. 8A depicts a plot of transmission vs device length in microns for a 3 µm to 0.22 µm taper. FIG. 8B depicts a similar plot of a 3 µm to 0.22 µm taper. The plots show that the transmission values are significantly better than other, known, approaches.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention. All references referred to above are hereby incorporated by reference.

What is claimed is:

1. A method of fabricating a waveguide platform on a silicon wafer; the method comprising:
   providing a wafer having a layer of crystalline silicon;
   lithographically defining a first region of a top layer of the wafer;
   electrochemically etching the waveguide platform to create porous silicon at the lithographically defined first region; and
   epitaxially growing crystalline silicon on top of the porous silicon to create a first upper crystalline layer with a first buried porous silicon region underneath,
   wherein the first buried porous silicon region defines a taper between a first waveguide region of crystalline silicon having a first depth and a second waveguide region of crystalline silicon having a second depth which is smaller than the first depth.

2. The method of claim 1, wherein the first waveguide region comprises a 3 µm waveguide platform.

3. The method of claim 1, wherein the second waveguide region comprises a sub-micron waveguide platform.

4. The method of claim 1, wherein the step of lithographically defining the first region comprises patterning a photoresist which acts as a mask during exposure of the waveguide platform to an electrochemical etch.

5. The method of claim 1, wherein, when viewed along a direction which is perpendicular to the plane of the silicon wafer, the taper has a chevron shape.

6. The method of claim 1, further comprising the additional steps of:
   lithographically defining an additional region within the first upper crystalline layer;
   electrochemically etching the waveguide platform to create porous silicon at the lithographically defined additional region; and
   epitaxially growing crystalline silicon on top of the porous silicon to create a second upper crystalline layer with a second buried porous silicon region underneath,
   wherein the second buried porous silicon region defines an additional taper between the second waveguide region of crystalline silicon having a second depth and a third waveguide region of crystalline silicon having a third depth which is smaller than the second depth.

7. The method of claim 6, wherein the second waveguide region forms an intermediate taper.

8. The method of claim 7 wherein, when viewed along a direction which is perpendicular to the plane of the silicon wafer, the intermediate taper has a chevron shape.

9. The method of claim 6, wherein the third waveguide region comprises a sub-micron waveguide platform.

10. The method of claim 6 wherein the second buried porous silicon region lies on top of the first buried porous silicon region.

11. The method of claim 10, wherein the second buried porous silicon region lies directly on top of the first buried porous silicon region in that the lower surface of the second buried porous silicon region is entirely contiguous with at least a portion of the upper surface of the first buried porous silicon region.

12. The method of claim 10 wherein the second buried porous silicon region is separated from the first buried porous silicon region by a layer of crystalline silicon which lies between the lower surface of the second buried porous silicon region and at least a portion of the upper surface of the first buried porous silicon region.

13. A tapered waveguide platform on a silicon wafer; the tapered waveguide platform comprising:
    a first waveguide region of crystalline silicon having a first depth;
    a second waveguide region of crystalline silicon having a second depth which is smaller than the first depth; and
    a taper formed from crystalline silicon, the taper located in-between the first waveguide region and the second waveguide region and the shape of the taper being entirely defined by a buried layer of porous silicon within the crystalline silicon which forms both the first waveguide region and the second waveguide region.

14. The tapered waveguide platform of claim 13, wherein the first waveguide region comprises a 3 μm waveguide platform.

15. The tapered waveguide platform of claim 13, wherein the second waveguide region comprises a sub-micron waveguide platform.

16. The tapered waveguide platform of claim 13, wherein, when viewed along a direction which is perpendicular to the plane of the silicon wafer, the taper has a chevron shape.

17. The tapered waveguide platform of claim 13, further comprising:
    a second buried porous silicon region which defines an additional taper located between the second waveguide region of crystalline silicon having a second depth and a third waveguide region of crystalline silicon having a third depth which is smaller than the second depth.

18. The tapered waveguide platform of claim 17, wherein, when viewed along a direction which is perpendicular to the plane of the silicon wafer, the additional taper has a chevron shape.

19. The tapered waveguide platform of claim 17, wherein the third waveguide region comprises a sub-micron waveguide platform.

* * * * *